Nov. 20, 1934.  P. F. SPERRY  1,981,395
HEAT EXCHANGE DEVICE
Filed July 30, 1934  2 Sheets-Sheet 1
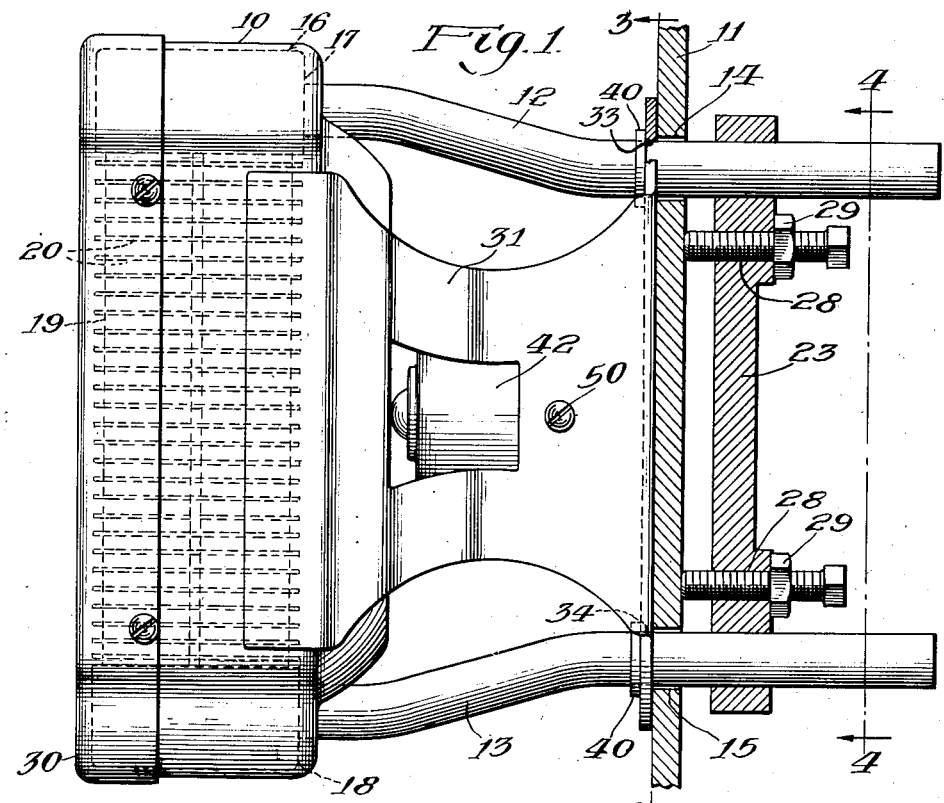
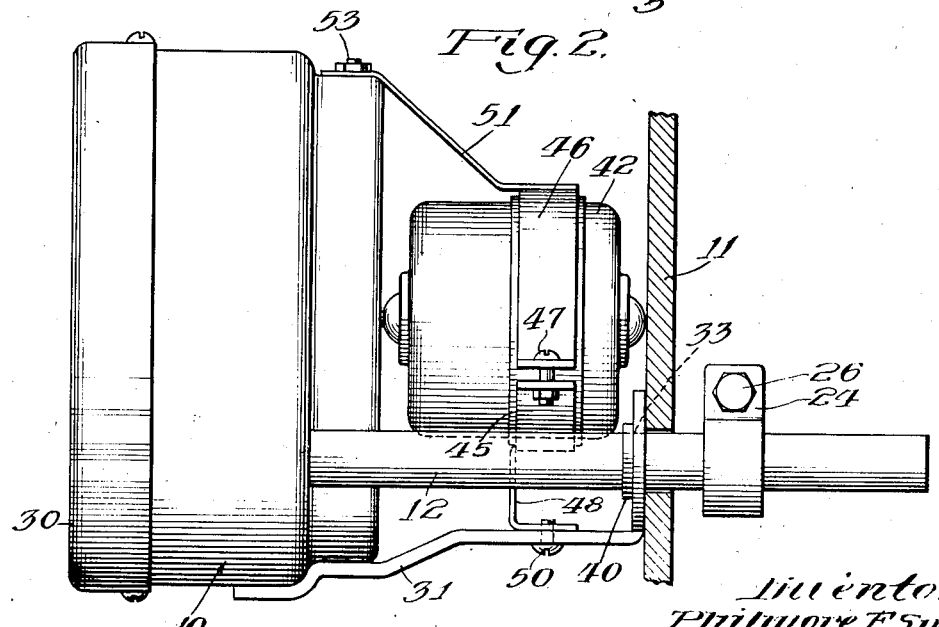
Inventor:
Philmore F Sperry,
By Zabel, Carlson & Wells,
Attorneys Nov. 20, 1934.   P. F. SPERRY   1,981,395
HEAT EXCHANGE DEVICE
Filed July 30, 1934   2 Sheets-Sheet 2
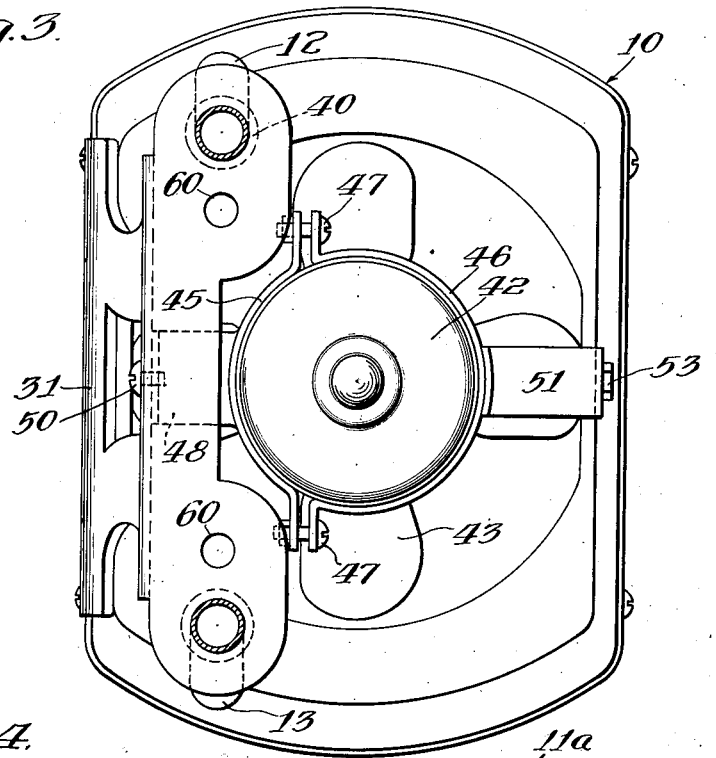
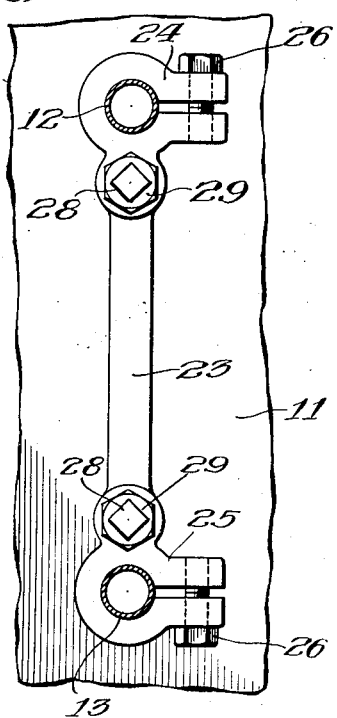
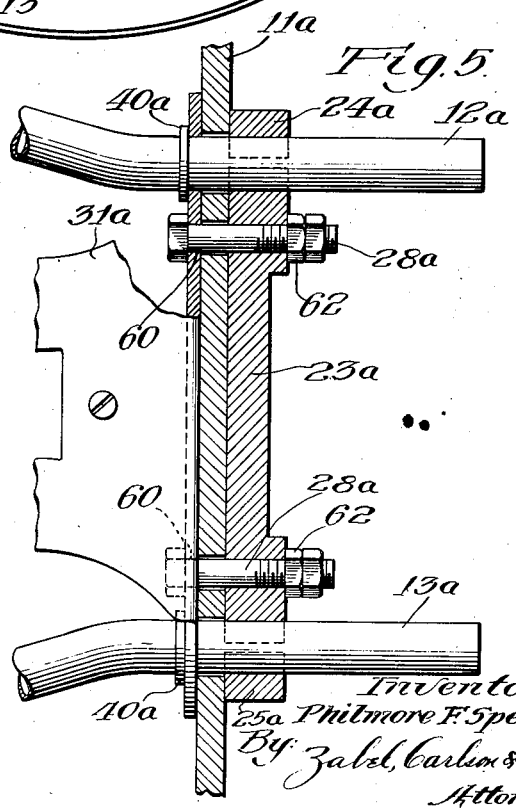

Patented Nov. 20, 1934

1,981,395

UNITED STATES PATENT OFFICE 1,981,395

HEAT EXCHANGE DEVICE

Philmore F. Sperry, Chicago, Ill., assignor to Excel Auto Radiator Company, a corporation of Delaware Application July 30, 1934, Serial No. 737,554

7 Claims. (Cl. 257—137)

The invention relates to heat exchange devices and is particularly adapted to be embodied in heaters for automobiles.

One form of the invention is embodied in an automobile heater which is connected to the cooling system of the automobile. The heater includes a radiator core which comprises upper and lower tanks connected by conduits extending to the cooling system of the automobile. Tubular members extending between the tanks are provided with thin fins or vanes to facilitate the transfer of heat from heated fluid flowing through the tubular members to the ambient air. The conduits which connect the tanks to the cooling system preferably comprise two relatively rigid tubes which are secured in any suitable manner to the tanks and extend through the dashboard of the automobile. A bracket is clamped to the tubes on one side of the dashboard and is provided with bolts which bear against that side of the dashboard. Bearing against the other side of the dashboard is a bracket which is secured to a housing in which the radiator core is mounted. The bolts associated with the first-mentioned bracket cooperate with the second-mentioned bracket to clamp the heater in place on the dashboard. Mounted on the second-mentioned bracket is an electric motor which drives a fan for advancing air through the radiator core.

In another form of the invention, the bolts carried by the first-mentioned bracket extend through the dashboard.

In the drawings, Fig. 1 is a side elevation of an automobile heater which embodies the invention, a portion of the automobile dashboard being shown in section.

Fig. 2 is a plan view of the apparatus shown in Fig. 1.

Fig. 3 is a section taken on line 3—3 of Fig. 1.

Fig. 4 is a section taken on line 4—4 of Fig. 1, and

Fig. 5 is a fragmentary section taken through the dashboard of an automobile and showing portions of heating apparatus embodying another form of the invention.

Referring for the present to Figs. 1 to 4, inclusive, wherein a preferred embodiment of the invention is illustrated, the reference character 10 designates generally a heater mounted on a dashboard 11 of an automobile and adapted to be connected to the cooling system of an automobile by means comprising tubes 12 and 13 which extend through apertures 14 and 15, respectively, provided in the dashboard 11.

The heater 10 comprises a radiator core 16 of well known construction. The radiator core 16 comprises upper and lower tanks 17 and 18, respectively, which communicate with each other through vertically extending tubes 19 provided with horizontally disposed fins 20 which facilitate the transfer of heat from a heated medium passing through the tubes to the surrounding air. As best shown in Fig. 1, the tubes 12 and 13 are connected to the tanks 17 and 18, respectively.

Mounted upon the tubes 12 and 13 beneath the hood (not shown) of the automobile is a bracket 23 which has split bosses 24 and 25 through which the tubes 12 and 13, respectively, extend. Bolts 26 screw-threaded in the split bosses 24 and 25 may be manipulated to clamp the bosses to the tubes 12 and 13. Screw-threaded in the bracket 23 are bolts 28 provided with lock nuts 29. The bolts 28 bear against the adjacent surface of the dashboard 11.

The radiator core 16 is disposed within a fabricated housing 30 which is, in turn, carried by a bracket 31 disposed to one side of the tubes 12 and 13 (Fig. 2). The bracket 31 is substantially L-shaped and one of its legs is secured to the housing 30 by any suitable means such as, for instance, spot welding. The other leg of the bracket 31 is provided with apertures 33 and 34 through which the tubes 12 and 13, respectively, extend.

Annular flanges or beads 40 brazed or otherwise secured to the tubes 12 and 13 abut against the bracket 31 at the points through which the tubes 12 and 13 extend through the bracket.

The heater is provided with an electric motor 42 which drives a fan 43 (Fig. 3). The fan 43, when driven, advances air between the tubes 19 so that there will be an effective exchange of heat between the heated fluid flowing through the tubes 19 and the air.

The motor 42 is clamped between two arcuate clamping members 45 and 46 which are secured to each other by bolts or screws 47. The clamping member 45 is provided with an integral extension 48 which is secured to the bracket 31 by a screw 50. Spot welded to the clamping member 46 is a bent bar 51 which is secured to the housing 30 by a screw 53.

When the improved heating apparatus illustrated in Figs. 1 to 4, inclusive, is to be assembled with the dashboard 11, the apertures 14 and 15 are first drilled through the dashboard. The heater 10, assembled with the tubes 12 and 13, the motor 42 and the bracket 31 is then brought into the position illustrated in Fig. 1, in which position the tubes 12 and 13 extend through the apertures 14 and 15, respectively. The bracket 23 is then mounted upon the tubes 12 and 13 and secured thereto through the medium of the bolts 26 which are adjusted to cause the split bosses 24 and 25 to clamp the tubes 12 and 13, respectively. The bolts 28 are then manipulated until the bracket 31 is drawn firmly against the dashboard 11. The bolts 28 then co-operate with the bracket 31 to clamp the heating apparatus to the dashboard. The lock nuts 29 may then be adjusted to insure that vibration will not cause the bolts 28 to unscrew.

It will be noted that the tubes 12 and 13 and the bracket 31 are disposed to one side of the center line of the heating apparatus (Fig. 2).

It is understood, of course, that the tubes 12 and 13 are connected to the cooling system (not shown) of the automobile by flexible hose or any other suitable means. In practice, the heated cooling fluid circulates through the radiator core 16 by way of the tubes 12 and 13 and the fan 43 advances air between the tubes 19 so that the air being advanced is heated rapidly and efficient.

In Fig. 5, another form of the invention is illustrated. The reference character 31a designates a bracket which is identical with the bracket 31 described above. Both brackets are provided with apertures 60. In Fig. 5, bolts 28a extend through the apertures 60. The bolts 28a are screw-threaded in a bracket 23a which is preferably identical to the bracket 23 described above and is provided with split bosses 24a and 25a which are clamped upon tubes 12a and 13a, respectively. The bolts 28a are provided with nuts 62 which bear against the bracket 23a. The heads of the bolts 28a bear against the bracket 31a. The bracket 31a carries a radiator core (not shown) preferably identical with the radiator core 16 described above and this radiator core is connected to the tubes 12a and 13a in a manner well known to those skilled in the art.

It will be readily understood that the bolts 28a and the nuts 62 may be manipulated to clamp a dashboard 11a between the bracket 31a and the bracket 23a. The brackets 23a and 31a will then support the heating apparatus from the dashboard 11a.

The tubes 12a and 13a are provided with annular flanges or beads 40a which bear against the bracket 31a. The beads 40a are brazed or otherwise secured to the tubes 12a and 13a.

The beads 40 and 40a are provided so that the connections between the tubes 12, 13, 12a and 13a and the associated radiator cores will not be broken or damaged when the bolts 28 or 28a are manipulated to secure the heating apparatus to the dashboard.

Obviously, the heating apparatus shown in Figs. 1 to 4, inclusive, is identical with that associated with the apparatus shown in Fig. 5. However, in Fig. 5, the bolts 28a extend through the dashboard 11a while in Figs. 1 to 4, inclusive, the bolts 28 simply bear against the adjacent surface of the dashboard 11.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

I claim:

1. The combination with a heater of the kind described having a radiator core adapted to be mounted upon the dashboard of an automobile and having conduits connected thereto for conducting a heating medium through said core, of means for supporting said heater on said dashboard, said means comprising a bracket fixed with respect to said radiator core and disposed on one side of said dashboard, a second bracket secured to said conduits and disposed on the other side of said dashboard, and means carried by one of said brackets and co-operating with the other to clamp the dashboard between said means and said other bracket.

2. The combination with a heater of the kind described having a radiator core adapted to be mounted upon the dashboard of an automobile and having conduits connected thereto for conducting a heating medium through said core, of means for supporting said heater on said dashboard, said means comprising a bracket carrying said radiator core and disposed on one side of said dashboard, and a second bracket extending between and secured to said conduits and disposed on the other side of said dashboard, said brackets clamping said dashboard between them.

3. The combination with a heater of the kind described having a radiator core adapted to be mounted upon the dashboard of an automobile and having conduits connected thereto for conducting a heating medium through said core, of means for supporting said heater on said dashboard, said means comprising a housing holding said radiator core, a bracket secured to said housing and disposed on one side of said dashboard, and a second bracket extending between and secured to said conduits and disposed on the other side of said dashboard, said brackets clamping said dashboard between them.

4. The combination with a heater of the kind described having a radiator core adapted to be mounted upon the dashboard of an automobile and having conduits connected thereto for conducting a heating medium through said core, of means for supporting said heater on said dashboard, said means comprising a bracket carrying said radiator core and disposed on one side of said dashboard, a second bracket extending between and secured to said conduits and disposed on the other side of said dashboard and a bolt whereby said brackets are secured to each other to clamp said dashboard between them.

5. The combination with a heater of the kind described having a radiator core adapted to be mounted upon the dashboard of an automobile and having conduits connected thereto for conducting a heating medium through said core, of means for supporting said radiator on said dashboard, said means comprising a bracket carrying said radiator core and disposed on one side of said dashboard, a second bracket extending between and secured to said conduits and disposed on the other side of said dashboard, and a bolt carried by one of said brackets and co-operating with the other to clamp the dashboard between said bolt and said other bracket.

6. The combination with a heater of the kind described having a radiator core adapted to be mounted upon the dashboard of an automobile, of conduits connected to said radiator core for conducting a heating medium therethrough, means on said conduits forming shoulders thereon, a bracket carrying said radiator core and disposed on one side of said dashboard, said bracket having apertures through which said conduits extend, said shoulders on said conduits abutting against said bracket, and means carried by said conduits and disposed on the other side of said dashboard, said bracket and said means co-operating to clamp the dashboard between them.

7. The combination with a heater of the kind described having a radiator core adapted to be mounted upon the dashboard of an automobile and having conduits connected thereto for conducting a heating medium through said core, of means for supporting said heater on said dashboard, said means comprising a member carrying said radiator core and disposed on one side of said dashboard, and a second member clamped to said conduits and co-operating with the first-mentioned member to clamp said dashboard between them.

PHILMORE F. SPERRY.